US009406100B2

United States Patent
Akenine-Moller et al.

(10) Patent No.: US 9,406,100 B2
(45) Date of Patent: *Aug. 2, 2016

(54) IMAGE PROCESSING TECHNIQUES FOR TILE-BASED RASTERIZATION (71) Applicant: Intel Corporation, Santa Clara, CA (US)

(72) Inventors: Tomas G. Akenine-Moller, Lund (SE); Robert M. Toth, Lund (SE); Jon N. Hasselgren, Bunkeflostrand (SE); Carl J. Munkberg, Malmo (SE); Franz P. Clarberg, Lund (SE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/931,285

(22) Filed: Nov. 3, 2015

(65) Prior Publication Data

US 2016/0055614 A1    Feb. 25, 2016

Related U.S. Application Data

(63) Continuation of application No. 13/516,781, filed as application No. PCT/US2009/069353 on Dec. 21, 2009, now Pat. No. 9,183,608.

(51) Int. Cl.
*G06T 1/20*    (2006.01)
*G06T 11/40*    (2006.01)

(52) U.S. Cl.
CPC . *G06T 1/20* (2013.01); *G06T 11/40* (2013.01); *G06T 2210/12* (2013.01)

(58) Field of Classification Search
None
See application file for complete search history.

(56) References Cited

U.S. PATENT DOCUMENTS

| 6,344,852 | B1 | 2/2002 | Zhu |
| 6,697,063 | B1 | 2/2004 | Zhu |
| 6,753,878 | B1 | 6/2004 | Heirich et al. |
| 6,816,161 | B2 | 11/2004 | Lavelle |
| 8,194,071 | B2 | 6/2012 | Meinds |
| 2009/0058848 | A1 | 3/2009 | Howson |
| 2011/0090220 | A1 | 4/2011 | Molnar |

OTHER PUBLICATIONS

Greene et al., "Hierarchical Z-buffer visibility", Proceedings of the 20th Annual Conference on Computer Graphics and Interactive Techniques, 1993, pp. 231-238.

(Continued)

*Primary Examiner* — Ryan D McCulley
(74) *Attorney, Agent, or Firm* — Trop Pruner & Hu, P.C.

(57) ABSTRACT

Techniques are described that can delay or even prevent use of memory to store triangles associated with tiles as well as processing resources associated with vertex shading and binning triangles. The techniques can also provide better load balancing among a set of cores, and hence provide better performance. A bounding volume is generated to represent a geometry group. Culling takes place to determine whether a geometry group is to have triangles rendered. Vertex shading and association of triangles with tiles can be performed across multiple cores in parallel. Processing resources are allocated for rasterizing tiles whose triangles have been vertex shaded and binned over tiles whose triangles have yet to be vertex shaded and binned. Rasterization of triangles of different tiles can be performed by multiple cores in parallel.

9 Claims, 7 Drawing Sheets

(56) References Cited

OTHER PUBLICATIONS

Hasselgren et al., "Automatic pre-tessellation culling", ACM Transactions on Graphics (TOG), vol. 28, Issue 2, Article No. 19, Apr. 2009, 10 pages.

Hasselgren et al., "PCU: the programmable culling unit", ACM Transactions on Graphics (TOG), vol. 26, Issue 3, Article No. 92, Jul. 2007, 10 pages.

PCT Search Report and Written Opinion in corresponding PCT/US2009/069353 dated Aug. 31, 2010 (8 pages).

FIG. 1

PRIOR ART

IMAGE PROCESSING TECHNIQUES FOR TILE-BASED RASTERIZATION

CROSS-REFERENCE TO RELATED APPLICATIONS

This is a continuation application based on non-provisional application Ser. No. 13/516,781 filed on Jun. 18, 2012, which is a 371 of PCT/US2009/069353 filed on Dec. 21, 2009, hereby expressly incorporated by reference herein.

FIELD

The subject matter disclosed herein relates generally to graphics processing, including rasterizing images for display.

RELATED ART

Figure 1:
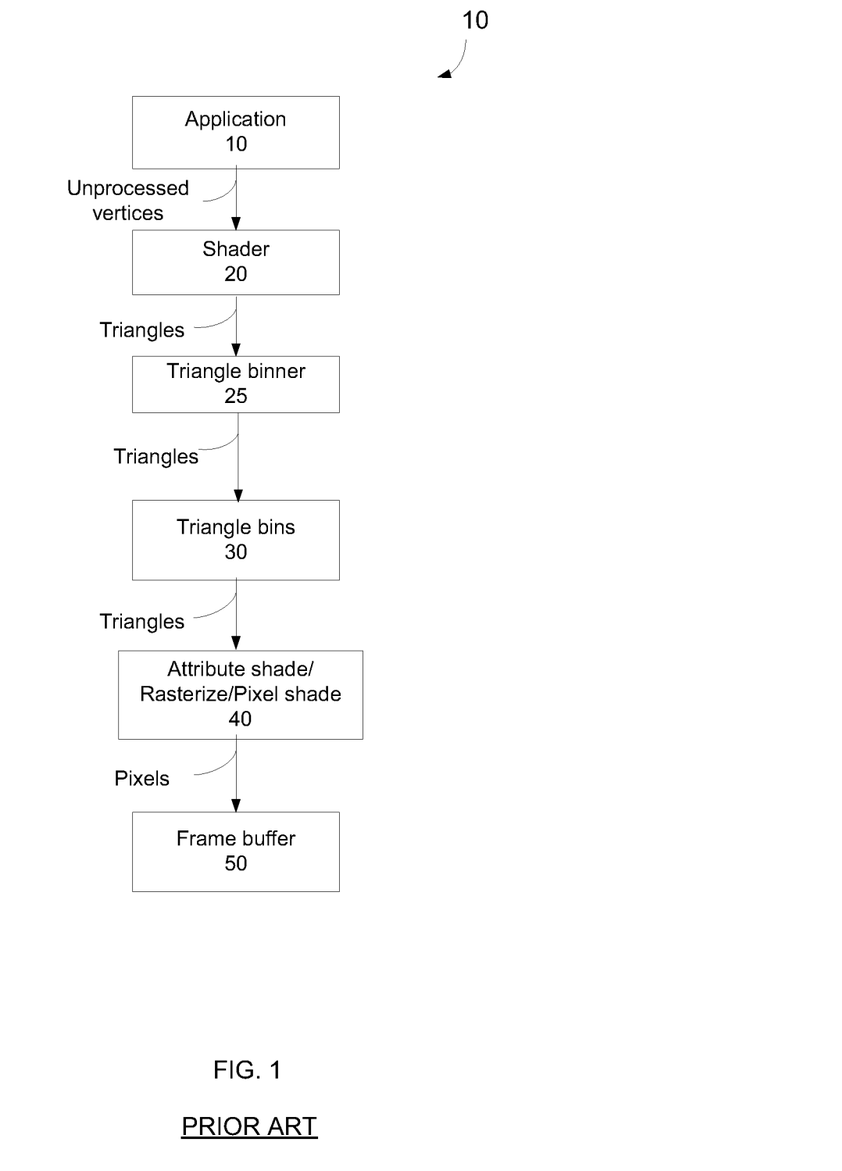
FIG. 1 depicts an example of a prior art rasterization architecture.

Rasterization involves converting an image, described in a vector graphics format, into a raster image (pixels or dots) for output to a video display or for storage. FIG. 1 depicts an example of a prior art rasterization architecture. An application 10 provides unprocessed vertices to a shader 20. Shader 20 performs vertex shading on the vertices in the scene. Shader 20 provides processed vertices representing triangles to triangle binner 25. Triangle binner 25 sorts the triangles into the tiles that the triangles overlap with on screen. Each tile has a bin where information regarding all triangles overlapping that tile is stored. Triangle binner 25 stores triangles into triangle bins 30. Triangle bins 30 represent the bins that store triangles associated with tiles. Front-end processing includes boxes 20, 25, and 30. In box 40, each core picks a tile/bin and performs attribute shading, pixel shading, and rasterization on triangles. Resulting pixels are stored in frame buffer 50. Back-end (BE) processing includes boxes 40 and 50.

With large screen resolutions, there are many more tiles/bins than cores. Accordingly, substantial memory can be used to hold all vertex information in the bins even though there may be a long time before vertex information is needed for pixel shading and rasterization. The memory used to hold vertices to be processed may be very large and this may in turn hinder performance of the rasterization system. In addition, there is no possibility to reuse the memory from an already processed bin for subsequent binning because all bins already contain their vertex-shaded contents, i.e., all vertices must be processed before rasterization can be done.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

The publication in Anthony Apodaca and Larry Gritz, Advanced Renderman, Morgan Kauffman Publishers (2000) (hereafter "Renderman") describes generating micropolygons, generating bounding volumes based on the generated micropolygons, and storing the bounding volumes and pointers to surfaces to be tessellated. RenderMan also allows the user to set a maxDisplacement parameter per geometric object, and this together with the non-displaced geometric object can be used to compute a conservative bounding volume. Those bounding volumes can be provided to the graphics pipeline for processing. A pointer to each geometry group whose bounding volume overlaps with a tile is stored in the geometry group bin of that tile. When rasterization occurs for a tile, the actual vertex processing and per-pixel shading takes place as needed.

Some embodiments determine the bounding volumes automatically using the vertex shaders based on the input geometry attributes. Techniques for determining bounding volumes automatically are described in the patent applications listed above under Related Applications.

In various embodiments, to render an image, the user/programmer or other source supplies the renderer with a global list of draw calls. Each draw call can be divided into smaller, disjoint, groups of triangles, which are referred to as geometry groups (GG). In some cases, the draw call only generates a single GG. Each draw call can store information about the GG such as the number of vertices in the GG, number of triangles in GG, and pointers to vertex information. In addition, a bounding volume (BV) can be computed and stored together with each geometry group in geometry group bins. As will be described later, triangle bins are bins where triangles are stored whereas geometry group bins store information about the GGs. In some cases, instead of generating triangles, other types of primitives can be generated such as quadrilaterals, points, lines, polygons, spheres, or other higher order geometries.

Various embodiments reduce storage used for bins because the transformed vertices are not stored per bin. A pointer to each geometry group whose bounding volume overlaps with a tile is stored in the geometry group bin of that tile. Vertex processing can be delayed until rasterization occurs for a tile. Instead of binning individual triangles to tiles, some embodiments determine a bounding volume (BV) of a complex primitive/object and bin the GGs to tiles, based on their associated BVs. The BV can, for example, be determined for each individual GG. Accordingly, less memory may be used to store the GG than to store bins of triangles associated with tiles.

Utilized memory needs for the bins could be much lower because transformed vertices are not stored in the geometry group (GG) bins, but are instead created as needed and stored into triangle bins. Delaying expansion of GGs to individual triangles may permit culling (e.g., view-frustum and occlusion) based on the bounding volumes to take place. For example, a complex draw-call completely hidden by another primitive might not have to be binned per-triangle if its bounding volume is covered by already binned triangles.

Various embodiments permit parallel processing of tiles by graphics processing units and multi-core and multi-threaded systems. For example, cores or threads can process geometry groups that overlap with a tile in parallel. In various embodiments, any process performed by a core can be performed by a thread and vice versa. From a memory perspective, various embodiments aim to finish the back end rasterization of tiles as quickly as possible by having more cores process the front-end and mid-end processing of a tile in parallel. For example, front-end processing can include determining a bounding volume of at least one geometry group and binning of the bounding volume to at least one geometry group tile. For example, mid-end processing can include shading vertices of the selected unprocessed geometry group and binning triangles associated with the selected unprocessed geometry group. This may permit reuse of a tile's memory for storing triangles once a tile has finished the back-end processing. For example, back-end processing may include identifying pixels that overlap with triangles and calculating the color of each pixel.

Compared to front-end processing in FIG. 1, front-end processing in various embodiments provides a coarse determination of where on a screen vertex processing is to be performed. Analysis of the coarse determination permits cores to focus on processing more spatially coherent or dense vertices in the mid and back ends. Front-end processing also permits prioritizing vertices for parallel processing in the mid and back ends.

Various embodiments provide graphics processing pipelines that are programmable at least based on Segal, M. and Akeley, K., "The OpenGL Graphics System: A Specification (Version 2.0)" (2004), The Microsoft DirectX 9 Programmable Graphics Pipe-line, Microsoft Press (2003), D. Blythe, "The Direct3D 10 System," Microsoft Corporation (2006), as well as other graphics pipeline specifications.

Figure 2:
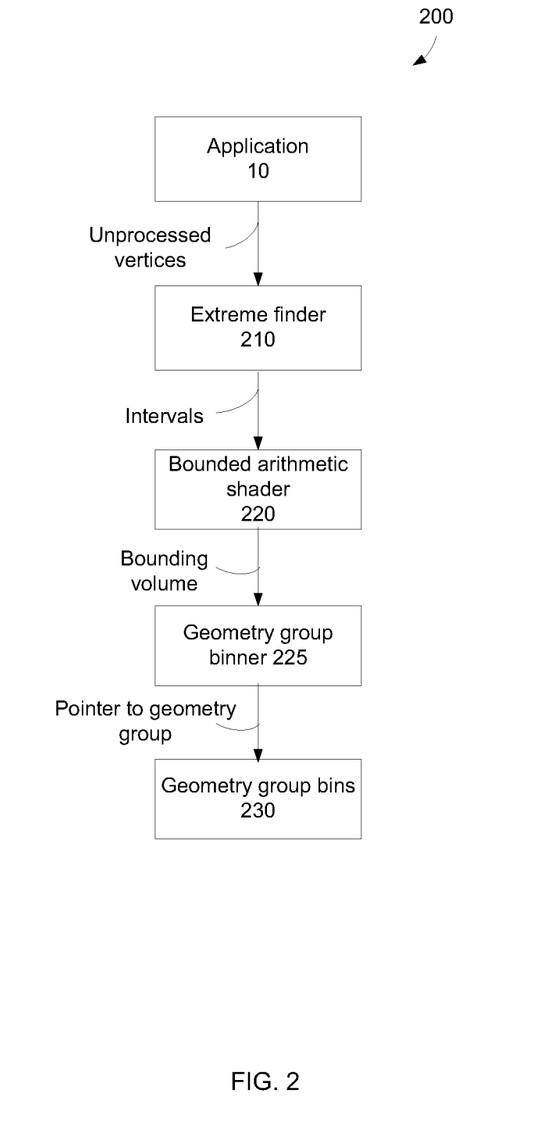
FIG. 2 depicts in block diagram format a system for binning geometry groups to geometry group bins.

FIG. 2 depicts in block diagram format a system for binning geometry groups to geometry group bins.

Application 10 can be any application that requests images to be displayed such as a computer game or drawing program. Application 10 may provide unprocessed vertices. A vertex is an n-dimensional attribute spanning an n-dimensional space. A vertex attribute is position (x, y, z), but could also include, for example, color, transparency, any number of texture coordinates, normals, and shininess parameters. Triangles are formed using connectivity information that can indicate that a triangle is formed from vertex N, vertex M, and vertex O, for example. For those vertices, extreme finder logic 210 determines minimum and maximum per scalar attributes of the unprocessed vertices. Extreme finder logic 210 can provide the minimum and maximum values of the vertex attributes (from the input parameter space) to bounded arithmetic shader 220. Note that the bounded arithmetic shader 220 only uses the min and the max values of the attributes that are used in the computation of the final position of the vertices. For example, the minimum and maximum values can be minimum and maximum position coordinates, minimum and maximum texture coordinates, minimum and maximum shininess, and minimum and maximum surface normal values.

In various embodiments, bounded arithmetic shader 220 performs bounded arithmetic techniques as described in the related applications to determine a bounding volume for each geometry group. For example, a geometry group could be a group of primitives to be tessellated or other group of some geometry. A bounding volume can be a three-dimensional axis-aligned box. In the case where the bounding volume is a box, a bounding volume is described as two values for each of x, y, and z coordinates. The six values in total represent the minimum and maximum of transformed vertices in clipspace. The bounding volume may also be described in other coordinate systems, such as homogeneous coordinates. The bounding volume can be other shapes such as a sphere, oriented bounding box, k-DOP (discrete oriented polytope, which is the intersection of k slabs), cylinder, polytope, and convex hull.

For example, TCU/DCCU techniques are described in Jon Hasselgren, Jacob Munkberg, and Tomas Akenine-Möller, "Automatic Pre-Tessellation Culling," which was published in ACM Transactions on Graphics in 2009. The TCU/DCCU technique may use bounded arithmetic to determine a bounding volume that fully encloses the transformed geometry in the geometry group based on the extreme intervals of its input data of the geometry group without explicitly executing the vertex shader for all the vertices in the geometry group. Other techniques to determine a bounding volume can be used where the techniques do not execute the vertex shader for all vertices. For example, a vertex shader can be configured to operate as Bounded Arithmetic (BA) shader 220 by not executing on vertices but instead replacing each instruction affecting the position with a corresponding bounded arithmetic instruction, which can be translated into one or more standard instructions.

In some embodiments, after a bounding volume has been determined for a geometry group, view frustum culling can be performed to potentially eliminate binning the GG, and to avoid further processing of the triangles in the GG.

Bounded arithmetic shader 220 determines a bounding volume for a geometry group. In some cases, each bounding volume contains a single geometry group.

Note that at this point, no vertex shading has been performed apart from determining the bounding volumes, which is performed using generalized vertex transformation computations (executed in BA shader 220), which is described in the ACM Transactions on Graphics paper referenced above.

Geometry group binner 225 receives bounding volumes from bounded arithmetic shader 220. Geometry group binner 225 performs binning of the geometry groups to geometry group bins 230, based on which tiles overlap with a geometry group's bounding volume. For an axis-aligned box, a box is projected to screen-space and a determination is made whether the projection (a rectangle) overlaps with a tile (which is another rectangle). In some embodiments, a geometry group bin is associated with each tile. Each geometry group bin contains a list of geometry groups whose bounding volume overlaps with that tile. Geometry group binner 225 may also insert a geometry group marker into the triangle bins of each tile the geometry group overlaps. A geometry group marker is a reference to a geometry group. For example, in some embodiments, the triangle bin may contain a geometry group marker for each geometry group whose bounding volume overlaps with that tile.

In some embodiments, application 10 could indicate vertex shading for a specific draw call is not to be delayed. In such case, the prior art rasterization tiling architecture of FIG. 1 could be used instead of the system described with regard to FIG. 2. In other cases, determination of bounding volumes may not take place. For example, an application may provide an indication that a geometry group covers an entire screen or triangles are wildly spread across a screen. In such cases, prior art rasterization tiling architecture of FIG. 1 could be used.

In various embodiments, instead of system 200 determining bounding volumes, the client application can selectively supply conservative bounding volumes for each GG. This technique can be significantly faster if such data is available and accurate. In such case, system 200 can be used to bin geometry groups to geometry group bins.

In various embodiments, when the system described with regard to FIG. 2 bins the geometry groups into geometry group bins, the system estimates the memory use of the geometry groups by a heuristic and includes that estimated memory usage with the information stored in the bins. Geometry group binner 225 can iteratively update an estimate of the memory usage for each tile. However, this could be done after all geometry groups have been geometry group binned as well. The heuristic could be the sum of the density of the bounding volumes (BVs) per tile, where the density of a BV could be the number of triangles in the geometry group (which has a BV associated with it) divided by the number of tiles that the BV overlap, or the number of triangles times the percentage of overlap between the tile and BV in screen space.

A priority queue can be used where the geometry group bins are sorted according to descending estimated memory use. Processing tiles roughly in descending memory usage order has the effect of reducing peak memory usage and the additional benefit of prioritizing tiles which are likely to take the longest time to execute. Prioritizing geometry group bins by memory use can provide significantly improved load balancing across cores. For example, cores can operate in parallel on the geometry groups that overlap with a tile.

In some embodiments, priority of geometry group bins could be in order of increasing number of triangles or geometry groups that overlap with a tile such that a tile with fewer triangles or geometry groups are processed before a tile with more triangles or geometry groups.

Figure 3:
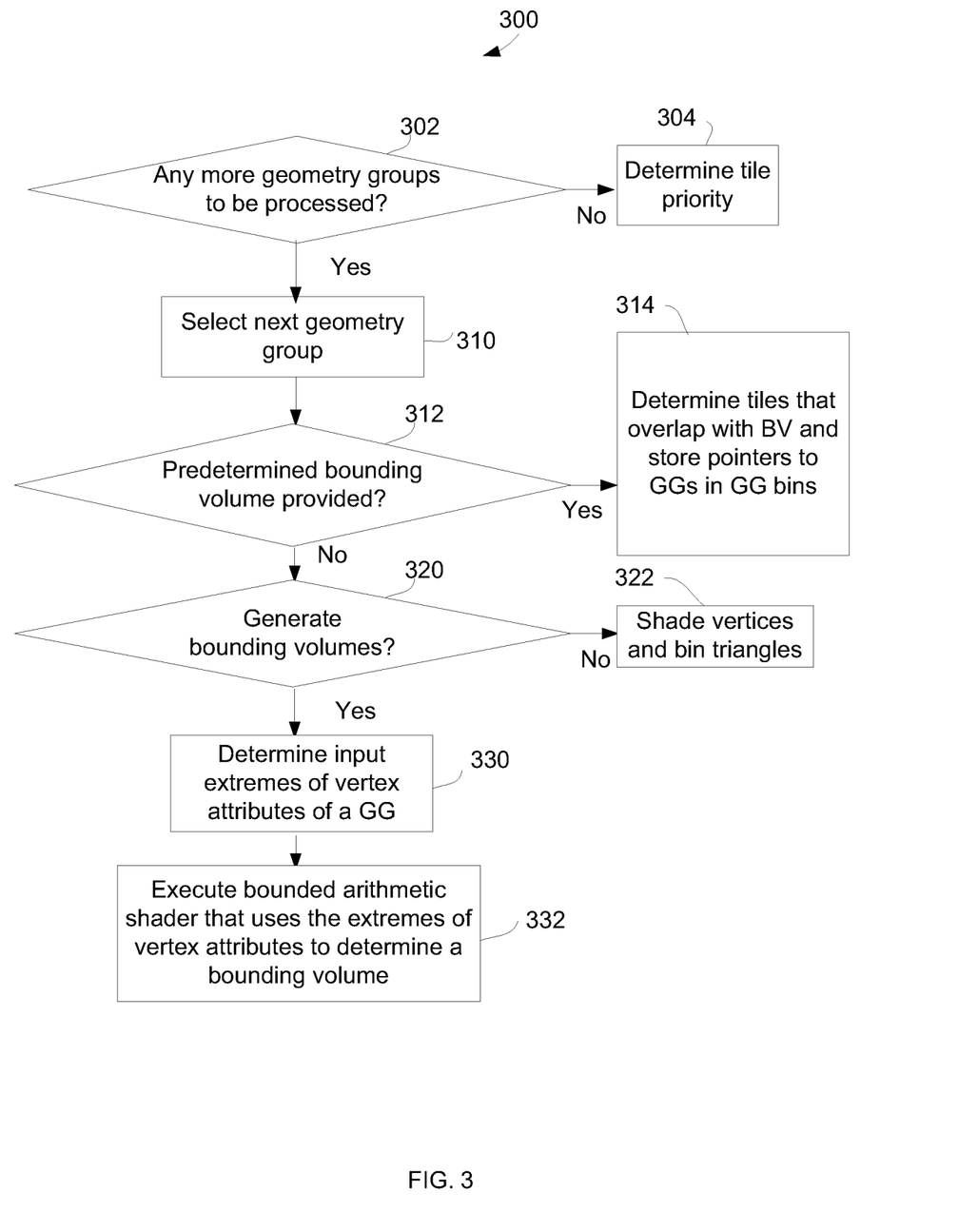
FIG. 3 depicts an example of a process that can be used to determine geometry group bins for geometry groups and vertex shade and bin triangles.

FIG. 3 depicts an example of a process that can be used to determine geometry group bins for bounding volumes of geometry groups and vertex shade and bin triangles. For example, process 300 can be executed by one or more cores and/or one or more threads. Block 302 determines whether any more GGs are available to be processed. For example, GGs for unprocessed vertices may be provided by an application. If a GG is available to be executed, block 310 follows block 302. If no GG is available to be executed, block 304 follows block 302.

Block 304 includes determining tile priority. Tile priority can be used when determining which tile to vertex shade and bin triangles. For example, tile priority can be set according to the manners described with regard to FIG. 2 (e.g., increasing or decreasing memory usage or highest or lowest number of estimated triangles). After all tile priorities have been determined, the tiles are ready to be processed using the process of FIG. 5.

Block 310 includes processing the next geometry group. For example, the next geometry group can be selected as the next geometry group in submission order from the graphics API.

Block 312 includes determining whether a pre-determined bounding volume has been provided. For example, an application or other logic may provide pre-determined bounding volumes. For example, if a Renderman system is used, a maxDisplacement value can be provided and bounding volumes are predetermined. If pre-determined bounding volumes are provided, then block 314 follows block 312. If pre-determined bounding volumes are not provided, then block 320 follows block 312.

Block 314 includes determining which tiles a BV of a GG overlap and storing a pointer to each geometry groups in the respective tile's geometry group bins. A geometry group can also store a bounding volume. The unprocessed vertices associated with geometry groups can be already stored in application space. Although not depicted, block 302 follows block 314.

Block 320 includes determining whether to generate bounding volumes. For example, generating bounding volumes can be disabled if bounding volumes are provided by an application or other. For example, an application can provide a hint that GGs and their BVs should not be generated in cases where geometries cover an entire screen or are scattered randomly over a screen. If generating bounding volumes is enabled, then block 330 follows block 320. If generating bounding volumes is disabled, then block 322 follows block 320.

Block 322 includes shading vertices and binning triangles associated with a geometry group. For example, any conventional vertex shading and triangle-to-bin determination techniques can be used. Note that block 302 follows block 322.

Block 330 includes determining input extremes of vertex attributes of a geometry group. For example, techniques described with regard to extreme finder logic 210 can be used to determine input extremes of vertices of a geometry group.

Block 332 executes the bounded arithmetic shader that uses the extremes of the vertex attributes to determine a bounding volume. For example, techniques described with regard to bounded arithmetic shader 220 can be used to determine a bounding volume of the GG. Although not depicted, block 314 follows block 332.

Figure 4:
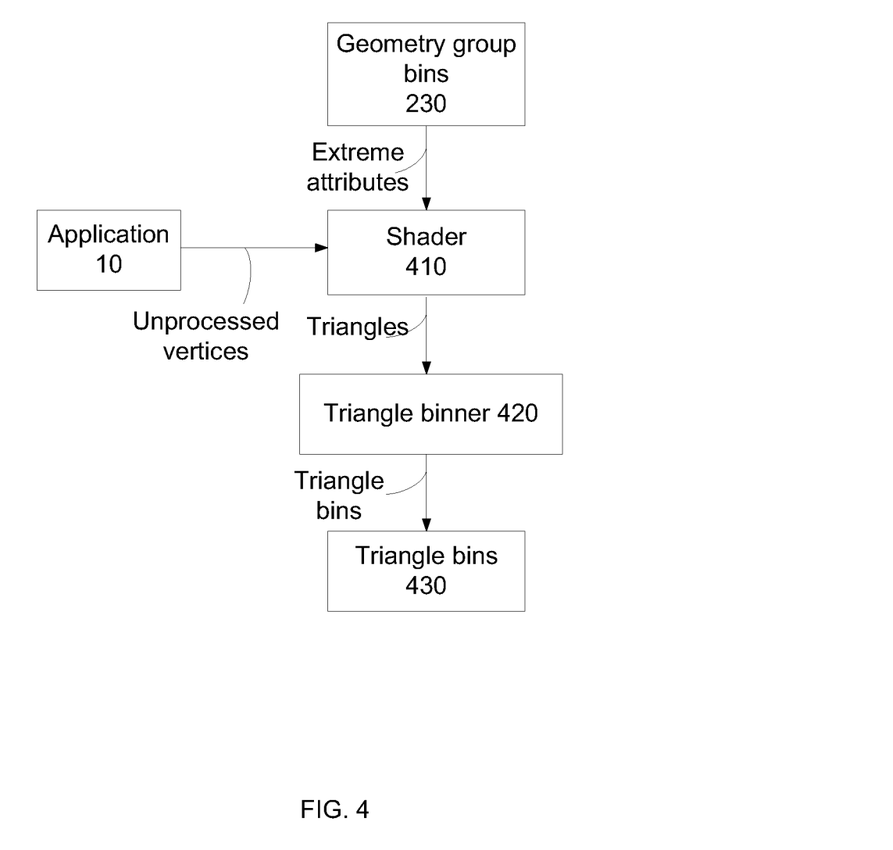
FIG. 4 depicts, in simplified form, operations performed by a core to bin triangles of geometry groups to tiles. This is also called mid-end (ME) processing.

At this point, each geometry group bin contains a list of geometry group(s) whose bounding volume overlaps with the tile associated with the GG bin. However, the geometry groups have not yet been binned on a triangle level. FIG. 4 depicts, in simplified form, operations performed by a core to bin triangles of geometry groups to triangle bins (e.g., triangle bins 430 in FIG. 4). After the processing represented by FIG. 4, back-end rasterization on triangles can take place.

A core may select a tile which has geometry groups whose vertices have not been vertex shaded and whose triangles have not been binned. For example, the core may select a tile that has geometry groups with the most number of estimated triangles that have not yet had its triangles binned. Vertex Shader 410 represents an operation where the core performs vertex shading of vertices of a GG. The core can access unprocessed vertices via pointers associated with the GG of interest. Pointers to unprocessed vertices are used to access unprocessed vertices from application 10 and the unprocessed vertices are stored in application space. Triangle binner 420 performs triangle binning into the triangle bins 430.

A geometry group's triangles may spread over tiles that have not yet been processed. Because the geometry groups may be processed in an order different from the order they were submitted by a graphics API, the binned triangles may not be written in the correct order in the tile bins. Various embodiments append the binned triangles to the geometry groups in per-core, first-in-first-out queues used in the bins.

Links are inserted in command streams to follow a pointer from the queued geometry group to the binned triangles (which do not necessarily reside in the same core's FIFO) and then back again at the end of the binned data.

Regular pick-sorting on a per-geometry group basis can take place, which will perform better than pick-sorting on a per-triangle basis. Pick-sorting is a technique to avoid synchronization when many cores are binning triangles to the same bin. In such a case, there can be N lists per bin, where N is the number of cores. If a core finds that a triangle overlaps a tile, it stores the triangle pointer into its list of the triangle bin associated with the tile. Each triangle has a submission order identifier, so the rest of the pipeline can choose a triangle to rasterize from the N lists and chooses the triangle with the lowest submission order identifier.

A core or thread can also perform back-end rasterization. In general, a core or thread selects a tile that is ready for back-end rasterization over a tile that has not yet had triangles of geometry groups binned. A tile is ready for back-end rasterization when all geometry groups, whose bounding volume overlaps that tile, have been processed (transformed and triangles binned) but back-end rasterization has not yet started. For example, the core may select a tile that is ready for back-end rasterization based on the tile with the most triangles.

Figure 5:
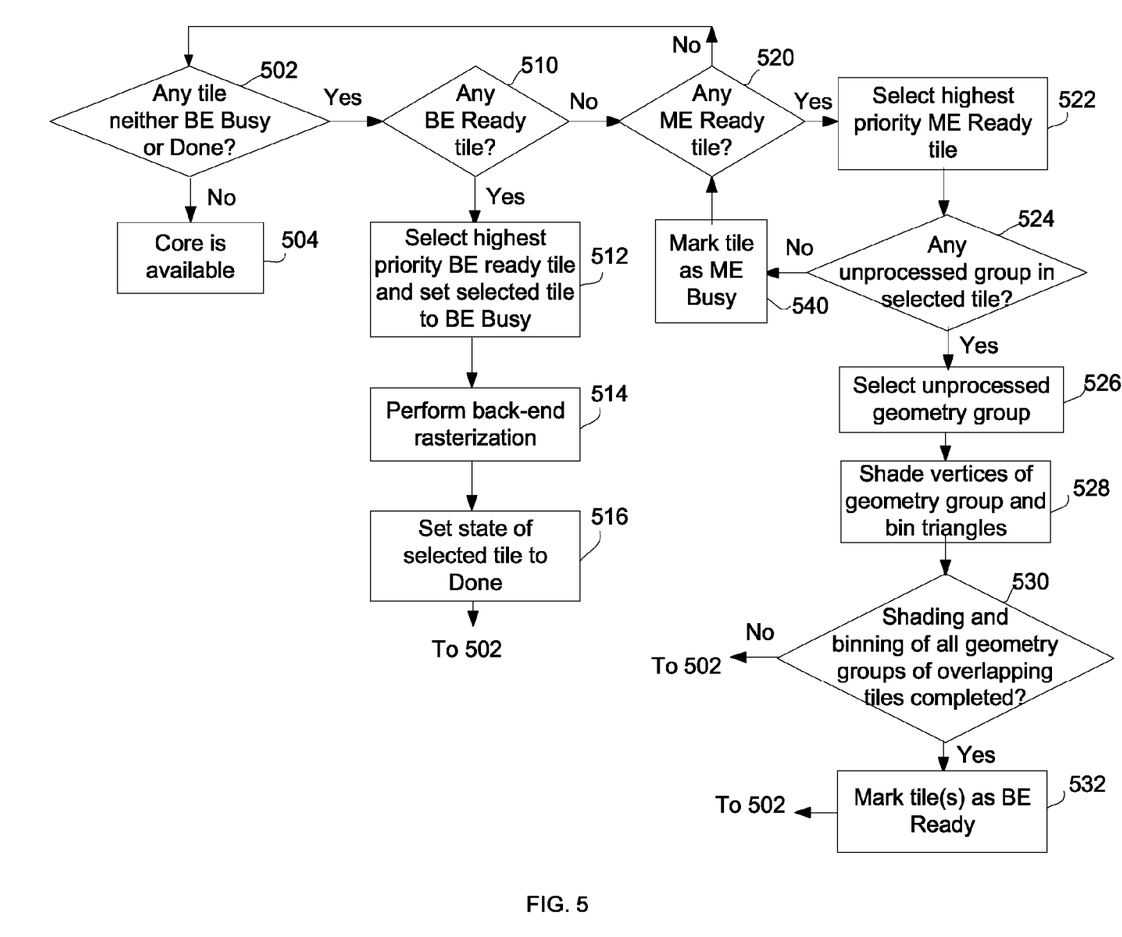
FIG. 5 depicts an example of a process that can be performed by one or more cores and/or one or more threads to process geometry groups either by vertex shading the geometry groups' vertices and binning related triangles of geometry groups or performing back-end rasterization on binned triangles.

FIG. 5 depicts an example of a process that can be performed by one or more cores and/or one or more threads to process geometry groups either by vertex shading the geometry groups' vertices and binning related triangles of geometry groups, or performing back-end rasterization on binned triangles. In this process there are several states for each tile.

ME Ready state represents that there is at least one unprocessed geometry group in the tile. An unprocessed geometry group may be one that has not yet had its vertex shading completed or not had its triangles binned to tiles.

ME Busy state indicates that all geometry groups in the tile are currently being processed by one or more cores/threads or have already been processed.

BE Ready state represents that a tile is ready for back-end rasterization. For example, BE Ready state may represent that there are no unprocessed geometry groups in the tile but rasterization of triangles has not yet begun. A geometry group is unprocessed if it has not been vertex shaded and had its triangles binned.

BE Busy state represents that back-end rasterization on a tile has begun.

Done state represents that back-end rasterization is completed on a tile. For example, Done state may represent that pixels are stored in a frame buffer and are ready for display.

Block 502 includes determining whether any tile is neither in the BE Busy nor Done states. If all tiles are in BE Busy or Done states, then block 504 follows block 502 and the core or thread is available to perform any type of processing. If any tile is not BE Busy and not Done states, then block 510 follows block 502.

Block 510 includes determining whether any tile is in a BE Ready state. If any tile is BE Ready, block 512 follows block 510. If no tile is BE Ready, then block 520 follows block 510.

Block 512 includes selecting the highest priority BE Ready tile and setting the selected tile to BE Busy. For example a highest priority BE Ready tile may be a tile with the most binned triangles, the tile with the most memory usage, or the tile with the most overlapping geometry groups.

Block 514 includes performing back-end rasterization on the selected tile. Back-end rasterization includes finding pixels that overlap with triangles and calculating the color of each pixel. An order in which a core may process triangles (or other geometric primitives) in the back end can be a sequential order set by the graphics API.

Block 516 includes setting a state of the back-end rasterized tile to Done. In a next iteration of the process of FIG. 5, a core will not process the tile in the Done state. Memory that stores triangles and other information uniquely allocated to the tile can be released and potentially used by other tiles or other processes as needed. Memory associated with more than one tile may be released and potentially used by other tiles or processes once all tiles the memory is associated with are in the Done state.

Block 520 includes determining if there is any tile that is in an ME Ready state. If no tile is in an ME Ready state, block 502 follows block 520. If any tile is in an ME Ready state, block 522 follows block 520.

Block 522 includes selecting a highest priority ME Ready tile. A highest priority ME Ready tile can be a tile with unbinned triangles and with the highest number of estimated triangles. In some embodiments, an estimate of the number of triangles can be determined by (1) taking the total number of the triangles of each geometry group, (2) determining how much a geometry group overlaps a tile, and (3) multiplying the number of triangles in a geometry group determined in (1) by the percentage in (2). If the entire geometry group overlaps only with a single tile, then the percentage is 100%. If half the geometry group overlaps with one tile, and the other half with another tile, then the percentage is 50% for both those tiles. In yet other embodiments, a priority of ME Ready tiles can be order of from top to bottom of screen and from left to right of screen. In some embodiments, an estimate of the number of triangles in a tile can be determined by a number of tessellation parameters attached to triangles. In other embodiments, the core selects the tile with unbinned triangles with the highest number of overlapping geometry groups.

Block 524 includes the core determining if there is any unprocessed geometry group in the selected ME Ready tile. If there is an unprocessed geometry group in the selected tile, then block 526 follows block 524. If there is no unprocessed geometry group in the selected tile, block 540 follows block 524.

Block 526 includes the core selecting an unprocessed geometry group that overlaps with the selected tile and that spans the most tiles, if such group exists. An unprocessed geometry group is one that has not been vertex shaded nor had triangles binned. For example, if any vertex shading has commenced on a geometry group, the group is not considered unprocessed. If geometry groups tie in terms of number of overlapped tiles, the geometry groups can be selected in order issued by graphics API. In other embodiments, geometry groups can be processed in submission order, but then the entire mid-end processing will finish later for some tiles.

Block 540 includes marking the highest priority ME Ready tile as ME Busy. The ME Busy state tells other cores that there is no geometry group processing work in that tile. The ME Busy state may indicate that a tile is not available for processing and accelerate the process of a core finding the next ME Ready tile to process.

Block 528 includes performing vertex shading and triangle binning for the selected unprocessed geometry group.

Block 530 includes determining whether all geometry groups have been vertex shaded and triangles binned for all tiles overlapping with the selected geometry group. A geometry group can overlap with several tiles. If processing of the geometry group results in any tile having all its overlapping geometry groups shaded and binned, then the tile is ready for back-end rasterization. If by shading and binning triangles for the selected geometry group, all geometry groups for any tile have been shaded and binned, then each such tile is marked as BE Ready in block 532. If by shading and binning triangles for the selected group, not all of the geometry groups for any tile have been shaded and binned, then block 502 follows block 530.

The process of FIG. 5 can involve as few tiles commencing processing with their vertex and pixel processing as possible. From a memory usage perspective, various embodiments aim to finish the back end rasterization of tiles as quickly as possible by having more tiles to work on the front end/mid end work in parallel. This may permit reuse of a tile's memory for storing triangles once a tile has finished the back-end work.

The process of FIG. 5 can potentially scale well if there is much geometry concentrated to a small section of the screen (e.g., 3DMark balloon or teapot in a stadium scenarios). In addition, load balancing among cores can be used to avoid idle cores. To achieve faster processing, communication between cores can be minimized. Light-weight communication between cores may be accepted. For example, communication between cores may be used to communicate tile state (BE busy, ME ready) and when updating the priority queues.

Figure 6:
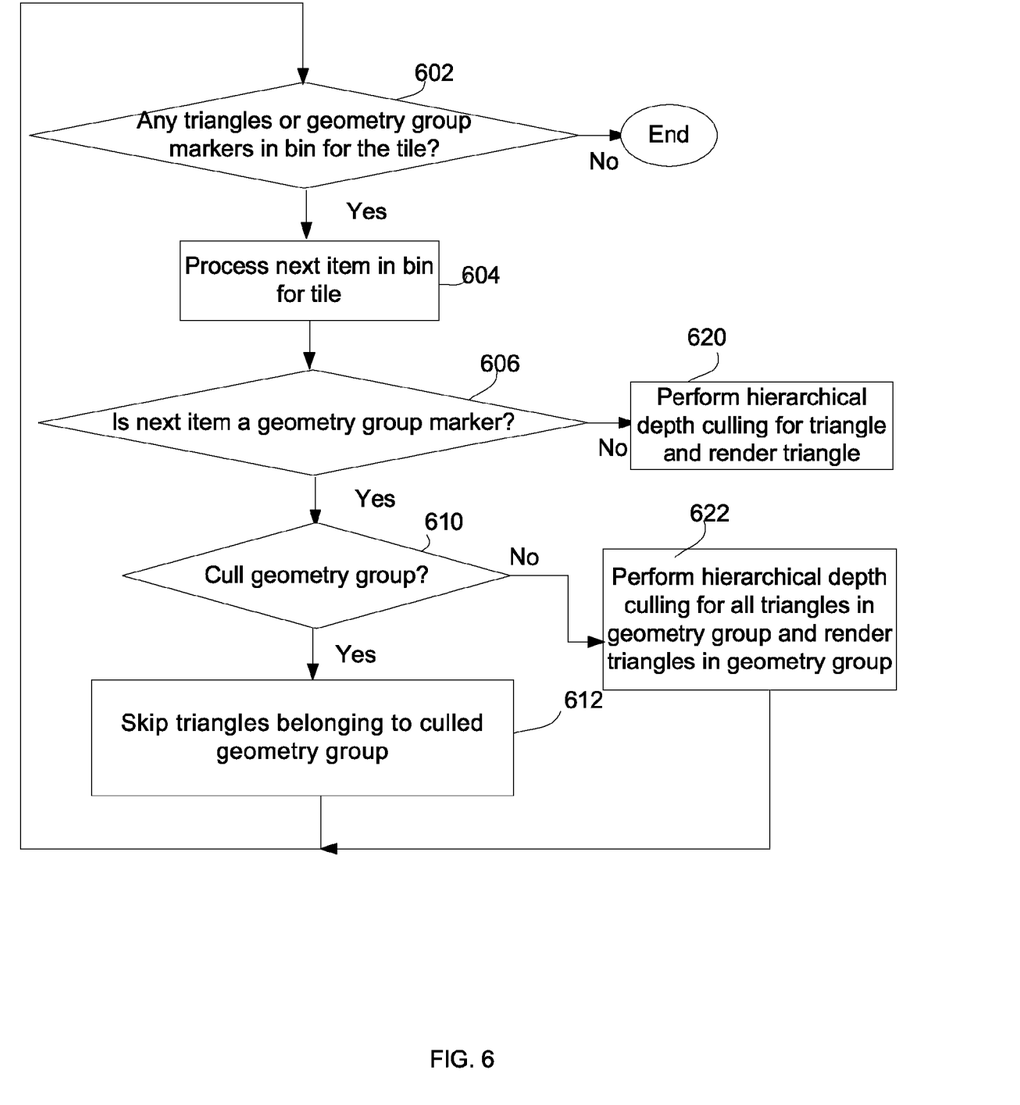
FIG. 6 depicts a suitable back-end rasterization process in accordance with some embodiments.

FIG. 6 depicts a suitable back-end rasterization process in accordance with some embodiments. The process of FIG. 6 can be performed by a core or a thread to process multiple tiles in parallel.

Block 602 includes determining if there are any triangles or geometry group markers in the bin for the tile. If there are any triangles or geometry group markers in the bin for the tile, block 604 follows block 602. If there are no triangles or geometry group markers in the bin for the tile, then the process ends.

Block 604 includes processing a next item from tile bin.

Block 606 includes determining if the next item is a geometry group marker. If the next item is a geometry group marker, then block 610 follows block 606. If the next item is a triangle, then block 620 follows block 606.

Block 610 includes determining whether the geometry group can be culled. For example, block 610 may include performing hierarchical depth culling for the entire geometry group by depth testing the bounding volume against the hierarchical depth buffer. Depth culling includes testing the zmin of the bounding volume against the zmax of the subtiles inside the tile overlapped by the bounding volume. The zmax of a subtile is the maximum depth value (sometimes called Z) inside the subtile. The zmin of the bounding volume is the minimum depth value on the bounding volume (or a conservative estimate of it). If zmin of the bounding volume is greater than all zmax of the subtiles overlapped by the bounding volume, then the geometry group can be culled because it will be occluded. Culling attempts to reduce the amount of rendered triangles. Note that the outcome of block 610 is that either the geometry group can be culled or not. In the case that a geometry group is culled, block 612 follows block 610. However, if the geometry group is not to be culled, block 622 follows block 610.

Block 612 includes skipping triangles belonging to the culled geometry group. Bounds for each geometry group are retained even after binning the triangles of that geometry group. When binning the geometry group, a marker is inserted in the triangle bin in front of the first triangle, associating the following X triangles with a geometry group's bounds. Accordingly, triangles associated with the culled geometry group can be skipped from rendering.

Block 620 includes possibly performing hierarchical depth culling for the triangle and rendering the triangle. In this context, culling attempts to reduce the amount of pixel processing. For example, a suitable technique to cull is Zmax-culling and is described in Akenine-Möller, Haines, and Hoffman, "Real-Time Rendering," $3^{rd}$ ed., pages 856-857. An early depth test may be used while rendering the triangle.

Block 622 includes possibly performing hierarchical depth culling for the triangles associated with the geometry group and rendering the triangles associated with the geometry group. Block 622 can be implemented in a similar manner as that of block 620.

Figure 7:
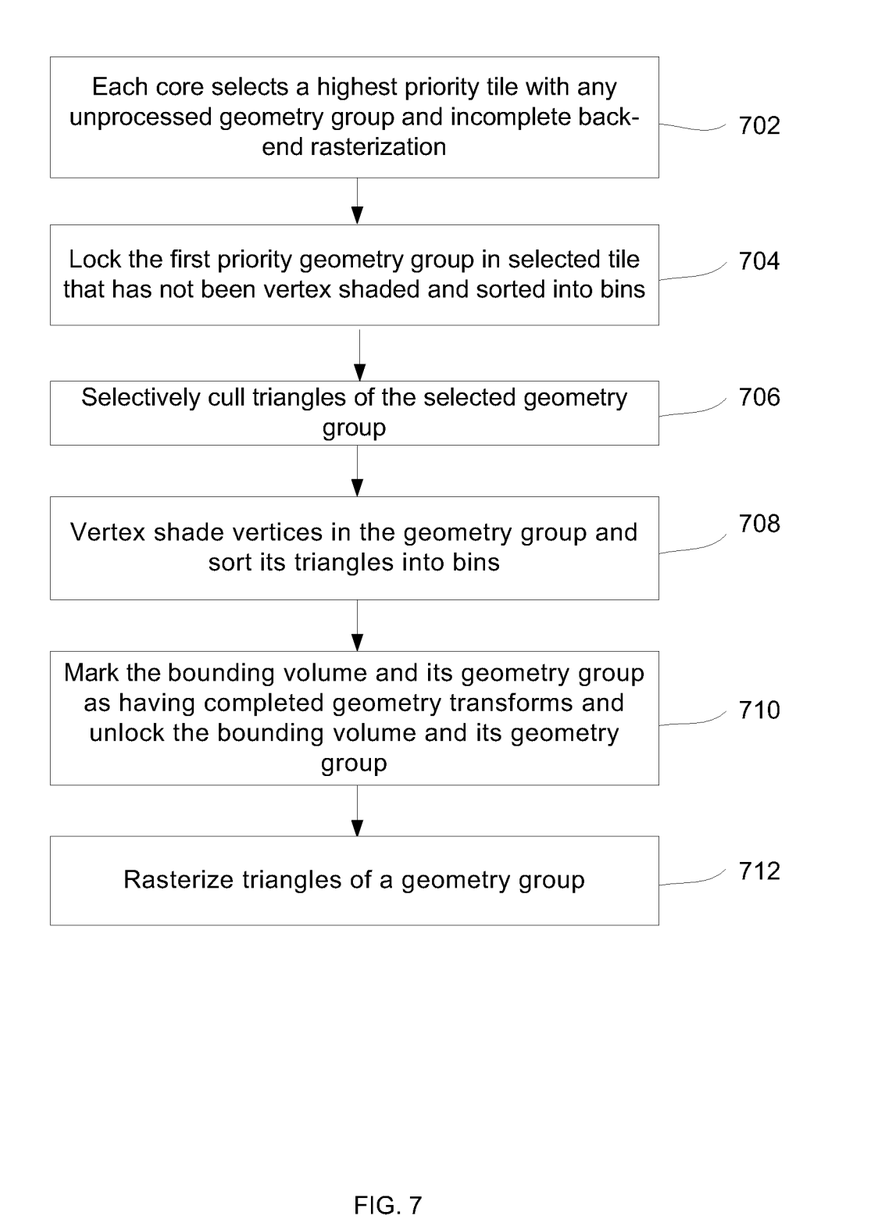
FIG. 7 depicts another embodiment of a manner that a core determines which geometry group is to be processed.

FIG. 7 depicts another embodiment of a manner that a core determines which geometry group is to be processed. The process of FIG. 7 can be performed after all geometry groups have been binned to GG bins. The process of FIG. 7 can be performed in parallel by multiple cores or threads so that multiple tiles are processed at the same time. Block 702 includes a core selecting a highest priority tile with geometry groups that have not been vertex shaded and binned and with incomplete back-end rasterization. The highest priority tile may be a tile with the most binned triangles, the tile with the most memory usage, or the tile with the most overlapping geometry groups.

Block 704 includes locking the first geometry group in the tile that has not yet been vertex shaded and sorted into bins. Geometry groups are processed in API submission order within a tile. A first geometry group is next available in the submission order and has not been vertex shaded and sorted into bins. Locking the geometry group causes the geometry group to be unavailable for processing by another core or thread until unlocked.

Block 706 includes occlusion culling the selected geometry group. Block 706 can determine whether the selected geometry group is hidden from view by other objects. For example, hierarchical-Z, such as Z-max, can be used to occlusion cull the selected geometry group. The Z-max methods check if a fragment or primitive is occluded (hidden) by the triangles drawn earlier. Hierarchical Z-Buffer (HZ-Buffer) is a suitable Z-Max technique. Zmax-culling is described, for example, in Akenine-Möller, Haines, and Hoffman, "Real-Time Rendering," $3^{rd}$ ed, pages 856-857. If occluded, the vertex shader is not executed for the vertices in the geometry group, and the triangles in the geometry group are not binned nor rasterized. However, those triangles may be vertex shaded and binned if the bounding volume of the geometry group overlaps other tiles and are not occluded in other tiles.

Block 708 includes performing vertex shading of the vertices in the un-hidden geometry group and sorting its triangles into triangle bins. A geometry group that is not culled is un-hidden. If a bounding volume does not overlap other tiles, the bounding volume and the geometry group can be deleted or available to be overwritten in memory after vertex shading and sorting triangles into bins is completed, or if it is culled. Bounding volumes overlapping several tiles can use reference counters in order to keep track of when a geometry group is completely finished. Block 708 may also include standard triangle culling techniques.

Block 710 includes marking a bounding volume and its geometry group as having completed vertex shading and binning and unlocking the bounding volume and its geometry group.

Block 712 includes a core or thread rasterizing triangles of at least one geometry group. Geometry groups can be processed in order presented by an application. Rasterization order of the individual triangles inside a tile can be in the order presented by an application. After block 712, if all geometry groups in a tile have had triangles sorted into bins and the triangles rasterized, then all back-end rasterization has finished for that tile. In such a case, block 702 follows block 712.

Otherwise, block 704 follows block 712. In some cases, a core or thread can perform any of blocks 702-710 on a tile while another core or thread performs block 712 on another tile.

The process of FIG. 7 provides for commencing vertex and pixel processing of as few tiles as possible. From a memory usage perspective, only the active tiles contain their processed geometry at any time. Simple early occlusion culling on bounding volumes takes place before vertex shading to possibly avoid vertex shading, binning, and rasterization.

Accordingly, various embodiments of the process of FIG. 7 include: determining a bounding volume for a geometry group; binning the geometry group into at least one geometry group bin; selecting a tile with any geometry group that has not been shaded and sorted into bins; selecting a first geometry group; locking the selected geometry group; culling the selected geometry group; vertex shading vertices in the selected geometry group and sorting triangles to triangle bins; marking bounding volume and its geometry group as having completed geometry transforms; unlocking the geometry group to permit processing of the geometry; and selecting a geometry group for triangle rasterization. A selected tile can be a tile with the most binned triangles, the tile with the most memory usage, or the tile with the most overlapping geometry groups. A first geometry group can be the next available geometry group in API submission order. A geometry group selected for rasterization can be based on order of presentation by an application.

The following clauses and or examples pertain to further embodiments:

One example embodiment may be a system comprising a processor having multiple cores, a wireless interface communicatively coupled to the processor, a display device communicatively coupled to the processor, and a memory communicatively coupled to the processor, wherein at least one of the cores is configured to determine a first bounding volume for a first geometry group, determine a second bounding volume for a second geometry group during a time span overlapping with a time span to determine the first bounding volume, assign the first geometry group to one or more geometry group bins based on the first bounding volume, perform back-end processing on a tile identified as ready for back-end processing, and perform mid-end processing in response to not identifying a tile ready for back-end processing during a time span overlapping with the time span to perform back-end processing. The system may also include wherein to determine the first bounding volume and to determine the second bounding volume, at least one of the cores is to apply bounded arithmetic techniques to determine a bounding volume for each geometry group. The system may include The system of claim 1, wherein to perform back-end processing, at least one of the cores is to select a highest priority tile ready for back-end processing and perform back-end processing on triangles of the selected tile. The system may include wherein the highest priority tile comprises one of the following sets a first set of a tile with most binned triangles, a tile with most memory usage, and a tile with most overlapping geometry groups or a second set of a tile with least binned triangles, a tile with least memory usage, and a tile with least overlapping geometry groups. The system may include wherein to perform mid-end processing, at least one of the cores is to select a highest priority tile available for mid-end processing and vertex shade and triangle bin a geometry group associated with the selected tile. The system may include wherein the highest priority tile available for mid-end processing comprises one of a tile with any geometry group that has not been vertex shaded or triangle binned and with a highest estimated number of triangles or overlapping geometry groups. The system may include wherein to store the assignment of the first geometry group into the memory, and assign the second geometry group to one or more geometry group bins based on the second bounding volume during a time span overlapping with a time span to assign the first geometry group to one or more geometry group bins. The system may include said memory configured to store the assignment of the second geometry group into the memory. The system may include said memory configured to store the assignment of the first geometry group into the memory.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device such as a handheld computer or mobile telephone with a display.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A system comprising:

a processor having multiple cores;

a wireless interface communicatively coupled to the processor;

a display device communicatively coupled to the processor; and a memory communicatively coupled to the processor, wherein at least one of the cores is configured to:

determine a first bounding volume for a first geometry group;

determine a second bounding volume for a second geometry group during a time span overlapping with a time span to determine the first bounding volume;

assign the first geometry group to one or more geometry group bins based on the first bounding volume;

perform back-end processing on a tile identified as ready for back-end processing; and perform mid-end processing in response to not identifying a tile ready for back-end processing during a time span overlapping with the time span to perform back-end processing.

2. The system of claim 1, wherein to determine the first bounding volume and to determine the second bounding volume, at least one of the cores is to:

apply bounded arithmetic techniques to determine a bounding volume for each geometry group.

3. The system of claim 1, wherein to perform back-end processing, at least one of the cores is to:

select a highest priority tile ready for back-end processing and perform back-end processing on triangles of the selected tile.

4. The system of claim 3, wherein the highest priority tile comprises one of a tile with most binned triangles, a tile with most memory usage, a tile with most overlapping geometry groups, a tile with least memory usage, and a tile with least overlapping geometry groups.

5. The system of claim 1, wherein to perform mid-end processing, at least one of the cores is to:

select a highest priority tile available for mid-end processing and vertex shade and triangle bin a geometry group associated with the selected tile.

6. The system of claim 5, wherein the highest priority tile available for mid-end processing comprises one of:

a tile with any geometry group that has not been vertex shaded or triangle binned and with a highest estimated number of triangles or overlapping geometry groups.

7. The system of claim 1 said processor configured to store the assignment of the first geometry group into the memory, and assign the second geometry group to one or more geometry group bins based on the second bounding volume during a time span overlapping with a time span to assign the first geometry group to one or more geometry group bins.

8. The system of claim 7, said memory configured to store the assignment of the second geometry group into the memory.

9. The system of claim 1, said memory configured to store the assignment of the first geometry group into the memory.

* * * * *